(12) United States Patent
Weaver et al.

(10) Patent No.: US 8,739,236 B1
(45) Date of Patent: *May 27, 2014

(54) METHOD, APPARATUS, AND SYSTEM FOR INVOKING THIRD-PARTY CALL CONTROL VIA A CABLE-TELEVISION HOST DEVICE

(75) Inventors: Farni Weaver, Spring Hill, KS (US); Donald D. Dunham, Overland Park, KS (US); Arun Santharam, Overland Park, KS (US); Shingara S. Dhanoa, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,099

(22) Filed: Sep. 13, 2012

Related U.S. Application Data

(63) Continuation of application No. 10/909,881, filed on Aug. 2, 2004, now Pat. No. 8,281,355.

(51) Int. Cl.
*H04N 7/173* (2011.01)

(52) U.S. Cl.
USPC .............................. 725/110; 725/113; 725/40

(58) Field of Classification Search
USPC ........................................... 725/112, 113, 40
See application file for complete search history.

(56) References Cited

U.S. PATENT DOCUMENTS

| | | | | |
|---|---|---|---|---|
| 5,262,860 A | * | 11/1993 | Fitzpatrick et al. | 348/461 |
| 5,570,295 A | * | 10/1996 | Isenberg et al. | 379/90.01 |
| 6,920,431 B2 | * | 7/2005 | Showghi et al. | 705/15 |
| 2002/0054091 A1 | * | 5/2002 | Tomsen et al. | 345/748 |
| 2003/0023508 A1 | * | 1/2003 | Deep | 705/26 |
| 2003/0028873 A1 | | 2/2003 | Lemmons | 725/36 |
| 2005/0174987 A1 | * | 8/2005 | Raghav et al. | 370/351 |

* cited by examiner

*Primary Examiner* — Brian T Pendleton
*Assistant Examiner* — Olugbenga Idowu

(57) ABSTRACT

A method, apparatus, and system are provided for invoking third-party call control via a cable-television host device. A video signal is received into a cable-television host device, the video signal comprising an identifier associated with a first telephony endpoint. A command is received into the cable-television host device, the command requesting establishment of a communication session between the first telephony endpoint and a second telephony endpoint. A message is transmitted via a packet-switched network from the cable-television host device to a network entity, wherein the message comprises content based at least in part on the identifier, and wherein the message further comprises content for causing the network entity to invoke third-party call control to attempt to establish the communication session between the first telephony endpoint and the second telephony endpoint.

20 Claims, 4 Drawing Sheets

METHOD, APPARATUS, AND SYSTEM FOR INVOKING THIRD-PARTY CALL CONTROL VIA A CABLE-TELEVISION HOST DEVICE

CROSS-REFERENCE TO RELATED APPLICATION

This is a continuation of U.S. patent application Ser. No. 10/909,881, filed Aug. 2, 2004, the entire contents of which are hereby incorporated by reference.

BACKGROUND OF THE INVENTION

1. Field of the Invention

The present invention relates to cable television and, more particularly, to a method, apparatus, and system for invoking third-party call control via a cable-television host device.

2. Description of Related Art a. Cable Television

Few households in this country are without cable television. Typically, cable-television subscribers will have a cable-ready television connected via coaxial cable to a set-top box (STB) provided by a cable company (also known as a "cable-television-service provider" (CTSP)). The STB is, in turn, connected via coaxial cable to a wall outlet in the cable-television subscriber's home. This outlet represents a point-of-access to the CTSP's network, so that cable-television service may be provided to the subscriber. It has also become common for STBs to have digital capabilities, such as decoding a digital cable-television signal so that the subscriber can watch premium channels and pay-per-view events, in accordance with their particular subscription.

Cable-television service is typically provided on a number of channels, each occupying a discrete range of the cable-television spectrum. The cable-television spectrum is close to 1 GHz; most cable-television systems, however, use less than this maximum capacity, differing as to the amount actually used. Some systems have the capacity to provide channels over a frequency range of 54-350 MHz, while others may span 54-450 MHz, 54-550 MHz, or 54-750 MHz, etc., based in part on the varying needs of different service areas. Some recently constructed cable-television systems can provide channels over a spectrum with an upper end as high as 860 MHz.

Whatever spectrum a cable system uses above 54 MHz has traditionally been divided into 6-MHz-wide channels, each delivering one National Television Standards Committee analog television signal. Cable systems have recently introduced digital technology, and to preserve existing analog services, many systems use the portion of the spectrum above their prior usage for delivery of digital services. Furthermore, one 6-MHz-wide channel, known as the out-of-band management channel, is reserved for forward signaling purposes, to deliver conditional access and management messages, interactive program guides, and other data to STBs. The out-of-band management channel typically spans a 6-MHz-wide range below 50 MHz, though any one of the channels above 50 or 54 MHz may be used as well. And in addition to being able to receive data on the out-of-band management channel, STBs typically can use the channel to transmit messages to the CTSP's network to, for example, order pay-per-view movies.

Furthermore, many CTSPs have begun providing packet-data service to customers via existing cable-television networks. Customers using this service typically have a device known as a "cable modem" connected via coaxial cable to a wall outlet in their home. The cable modem typically acts as an interface between (i) the RF signals carried via the CTSP's HFC (Hybrid Fiber/Coaxial) network and (ii) the Ethernet signals carried by Ethernet cable between the cable modem and a packet-based device such as a personal computer or router.

The signals sent and received by cable modems typically use frequencies higher than those used for cable-television and the out-of-band management channel, though cable-modem signaling may be referred to as "out of band" as well, in that it occupies a range other than that used for television. As STBs and cable modems develop, many CTSPs are offering STBs having an integrated cable modem. These STBs are thus able to send and receive packet data at a rate much higher than the earlier-described STBs, which are sometimes known as "legacy" boxes.

b. Encoding Data in a Video Signal

It is known to encode data, such as a telephone number, into a video signal, such as an RF cable-television signal. One way of accomplishing this encoding is described in U.S. Pat. No. 5,570,295 to Isenberg et al., which is incorporated herein by reference. Isenberg teaches including an "escape sequence" in a video signal, followed by the data itself. Isenberg teaches that the escape sequence would comprise a "sequence of special characters not commonly used, hence easily recognized." A receiving system, such as a set-top box, would identify the escape sequence, and then capture the data. Isenberg suggests encoding the data into the "vertical blanking interval" ("vertical retrace interval") at the end of a frame of an analog video signal, or into any convenient portion of a digital video signal. If the data is a telephone number, the STB may then place a call to the associated number via a direct connection to a telephone network.

c. The Session Initiation Protocol (SIP)

Along with the development of the Internet, a protocol called the Session Initiation Protocol (SIP) has developed. SIP is a protocol useful for transmitting short messages between entities connected via one or more data networks, and is primarily used to set up, or initiate, media or communication sessions between entities. Relevant aspects of SIP are described in "SIP: Session Initiation Protocol," RFC 3261 (June 2002), which is incorporated by reference.

SIP is based on a request-response model similar to HTTP. Defined SIP requests ("methods") include INVITE and REGISTER, among others. SIP responses are associated with a three-digit number, placing each response in a class of responses. Responses of the form "1xx" ("180 Ringing") are provisional or informational responses, and indicate that the request is progressing but is not yet complete. "2xx" responses ("200 OK") indicate success, meaning that the request has completed successfully. "3xx" responses ("302 Moved Temporarily") indicate redirection, meaning that the requesting party should send the request to another location. "4xx" responses ("486 Busy Here"), "5xx" responses ("503 Service Unavailable"), and "6xx" responses ("603 Decline") indicate that some type of error or failure has occurred.

To set up a communication session between two entities, the first entity sends the second entity an INVITE request. The second entity may then respond with a 200 OK. When this is acknowledged by the first entity sending an ACK message to the second entity, the two entities have agreed on the parameters for the session, and may then send packets to each other as part of the session. INVITE, OK, and ACK messages have message bodies to carry the parameter data, or "session description information," which typically conforms to a protocol known as the Session Description Protocol (SDP), relevant aspects of which are described in "SDP: Session Description Protocol," RFC 2327 (April 1998), and "Support for IPv6 in Session Description Protocol (SDP)," RFC 3266 (June 2002), which are incorporated herein by reference.

In most SIP implementations, a server called a proxy or call agent maintains information about which users are currently logged in and how those users may be contacted, and forwards messages from sender to recipient, among other functions. When a SIP entity (such as a packet-based telephone) logs on, it would typically send a REGISTER message to the proxy, which would associate the entity's IP address with a SIP address (sip:user@domain) for later use.

d. Third-Party Call Control

SIP is useful in many contexts, one of which is third-party call control (3PCC), in which an entity known as a "controller" or "call management server" engages in signaling with two or more parties to set up a telephone call between or among the parties. 3PCC may be conducted with circuit-switched, packet-based, cellular wireless, other types of telephones, or any mixture thereof. Furthermore, 3PCC may be conducted using any number of protocols, including such circuit-switched protocols as ISUP (ISDN User Part) and such packet-based protocols as SIP. Relevant aspects of 3PCC using SIP are described in "Best Current Practices for Third Party Call Control (3pcc) in the Session Initiation Protocol (SIP)," RFC 3725 (April 2004), which is incorporated herein by reference.

3PCC in SIP typically involves a series of the above-described INVITE/OK/ACK exchanges between the controller and each party to the call. For simplicity, an example involving a controller setting up a call between two parties ("Phones A and B") will be described here. Furthermore, in this example, both Phone A and Phone B are packet-based telephones, capable of acting as SIP user agents (sending and receiving SIP messages).

To begin, the controller sends Phone A an INVITE message with no session description information. Phone A then sends a 200 OK to the controller, also without session description information. The controller sends an ACK to Phone A, including an IP address of 0.0.0.0 as the address Phone A "should" contact to begin the session. The use of this IP address, by convention, puts Phone A into an "on hold" state, and conveys to Phone A that it will later receive an INVITE message containing more substantive, useful parameters, which Phone A will then use to actually participate in a communication session.

Next, the controller sends an INVITE to Phone B, again not including session description information. Phone B responds by sending a 200 OK to the controller, though here, Phone B includes session description information, conveying media parameters (protocols, encoding, etc.) that would be acceptable to Phone B. The controller adjusts this session description information if necessary, and then sends an INVITE to Phone A that includes Phone B's "offer." Phone A responds with a 200 OK, including a message body having session description information that reflects Phone A's acceptance or rejection of the parameters from Phone B's offer.

The controller then determines a compatible set of parameters, adjusting the session description information from Phone A's "answer" if necessary, and transmits these parameters in an ACK to Phone B. The controller then sends an ACK to Phone A. Since the parameters for the session have been determined and conveyed to both parties, Phone A and Phone B may now send packets to each other that conform to these parameters, for the duration of the arranged call.

SUMMARY OF THE INVENTION

The present invention provides a method, apparatus, and system for invoking third-party call control via a cable-television host device, such as an STB connected to a user's television. Generally, the STB will receive a video signal via the cable network, typically carrying some number of television channels. A user may tune the STB to one such channel. While watching this channel, a commercial created for some advertiser, such as a pizza-delivery company, may be displayed on the screen. The portion of the video signal making up this commercial has an identifier, such as a URL (Uniform Resource Locator), encoded in the signal, perhaps in the manner described above. This identifier, and perhaps additional data, would have been encoded prior to the signal being transmitted from the cable provider to the STB.

Recognizing that the commercial contains the identifier, the STB prompts the user, perhaps by displaying an icon on the television, to initiate a telephone call between the advertiser and the user, most likely to place a pizza order. If the user wishes to have such a call initiated, the user could use a remote control to select the icon, and press a button such as "OK," "Select," or "Call." The STB will then transmit a message via the HFC network to the cable provider's network, using the out-of-band management channel in the case of a legacy box, or perhaps higher packet-data frequencies, if the STB has an integrated cable modem.

The message may then be routed to a server corresponding to the URL, perhaps on the cable provider's network or another network. In addition to the URL, the message may contain the user's phone number, or perhaps an identifier that the server could use to look up the number, such as an account number for example. Similarly, the message may contain data giving the user's geographic location, or information sufficient to enable determination of the location. The server then engages in or invokes third-party call control to initiate a call between the user and the pizza-delivery location closest to the user's location. The user may then place an order.

Many permutations exist as to how the present invention may operate, discussed more fully with respect to the drawings. As examples, the identifier could be a phone number, SIP address, URL, URI (Uniform Resource Identifier), or some other identifier. In general, the STB formats a message based on the identifier, and transmits the message to the cable network. Some such messages may be sent to a call management server, perhaps on the cable provider's network or another network. Other messages may be sent to an advertiser's server, which could then enlist a call management server to arrange the call. In general, the call is arranged without the STB needing a direct connection to a telephone network, such as a telephone line.

Thus, in one respect, an exemplary embodiment of the present invention may take the form of a method. In accordance with the method, a video signal is received into a cable-television host device, the video signal comprising an identifier associated with a first telephony endpoint. A command is received into the cable-television host device, the command requesting establishment of a communication session between the first telephony endpoint and a second telephony endpoint. A message is transmitted via a packet-switched network from the cable-television host device to a network entity, wherein the message comprises content based at least in part on the identifier, and wherein the message further comprises content for causing the network entity to invoke third-party call control to attempt to establish the communication session between the first and second telephony endpoints.

In another respect, an exemplary embodiment of the present invention may take the form of a cable-television host device comprising: a user interface; a television interface; a network interface; a processor; and a data storage, wherein the data storage comprises a computer-readable storage medium comprising instructions executable by the processor for causing the cable-television host device to: receive a video signal via the network interface, the video signal comprising an identifier associated with a first telephony endpoint; receive a command via the user interface, the command requesting establishment of a communication session between the first telephony endpoint and a second telephony endpoint; and transmit a message via the network interface via a packet-switched network to a network entity, wherein the message comprises content based at least in part on the identifier, and wherein the message further comprises content for causing the network entity to invoke third-party call control to attempt to establish the communication session between the first and second telephony endpoints.

In another respect, an exemplary embodiment of the present invention may take the form of a system comprising: a first telephony endpoint; a second telephony endpoint; a cable-television host device, wherein the cable-television host device comprises a first network interface and a first computer-readable storage medium comprising a first set of instructions executable by a first processor for causing the cable-television host device to: receive a video signal via the first network interface, the video signal comprising an identifier associated with the first telephony endpoint, receive a command, the command requesting establishment of a communication session between the first telephony endpoint and the second telephony endpoint, and transmit a message via the first network interface via a packet-switched network, wherein the message comprises content based at least in part on the identifier; and a network server, wherein the network server comprises a second network interface and a second computer-readable storage medium comprising a second set of instructions executable by a second processor for causing the network server to: receive the message via the second network interface via the packet-switched network, and invoke third-party call control to attempt to establish the communication session between the first and second telephony endpoints.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments of the present invention are described herein with reference to the following drawings, wherein like numerals denote like entities.

DETAILED DESCRIPTION OF EXEMPLARY EMBODIMENTS

1. Exemplary Architecture a. Exemplary Communications System

Figure 1:
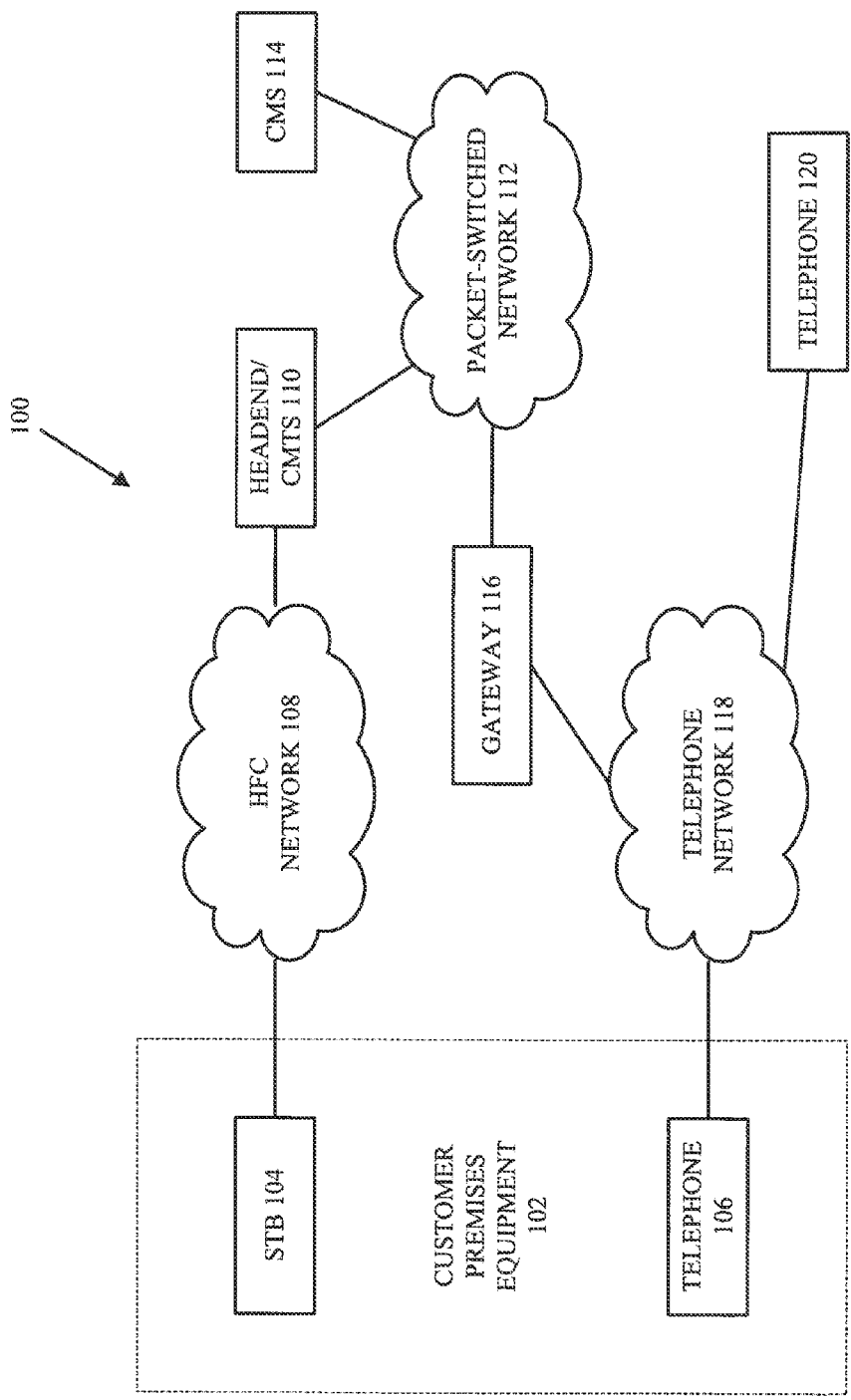
FIG. 1 is a simplified block diagram of an exemplary communications system, in which exemplary embodiments of the present invention may be employed.

FIG. 1 is a simplified block diagram of an exemplary communications system, in which exemplary embodiments of the present invention may be employed. It should be understood that this and other arrangements described herein are set forth only as examples. Those skilled in the art will appreciate that other arrangements and elements (e.g., machines, interfaces, functions, orders, and groupings of functions, etc.) can be used instead, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, communications system 100 includes customer premises equipment (CPE) 102, an HFC network 108, a headend/CMTS 110, a packet-switched network 112, a Call Management Server (CMS) 114, a gateway 116, a telephone network 118, and a telephone 120. Among other equipment and devices, CPE 102 includes a cable-television host device (or "set top box" (STB)) 104 and a telephone 106. Described more fully in connection with FIG. 2, STB 104 may be a legacy box, an STB having an integrated cable modem, or an integrated terminal device, physically integral to, for example, a television. In general, STB 104 may be any device arranged to receive and display analog and/or digital cable-television content, and which is capable of transmitting messages via HFC network 108.

Telephone 106 may be a circuit-switched telephone, connected to the Public Switched Telephone Network (PSTN) via a telephone line. Telephone 106 may also be a packet-based telephone, arranged to communicate over the Internet using, e.g., Voice over Internet Protocol (VoIP) telephony. Telephone 106 could also be a cellular wireless telephone, or some other wireless device capable of telephony operations. In that case, telephone 106 would communicate with telephone network 118 via an air interface. Such wireless communications may comply with a protocol such as CDMA2000®, described in "CDMA 2000® Series," TIA/EIA/IS-2000 Series, Rev. A (March 2000), which is incorporated herein by reference.

CPE 102 would likely also include a television or other display device (not shown), connected physically or wirelessly with STB 104, such that analog and digital content received by STB 104 would be displayed on the television or display device. CPE 102 may also include other equipment (also not shown), such as a VCR, DVD player, video game system, etc.

Cable-television content and other data may be transmitted from headend/CMTS 110 to STB 104 via Hybrid Fiber/Coaxial ("HFC") network 108. HFC network 108 may include any combination of fiber-optic cable and coaxial cable. HFC network 108 may contain a number of fiber nodes (not shown), which enable the transition between the fiber-optic-cable and coaxial-cable portions of the network. Any number of fiber nodes may be used to convert from fiber signals (carried by fiber-optic cable from headend/CMTS 110 to the fiber nodes) to RF signals (carried by coaxial cable from the fiber nodes to STB 104).

The "headend" functionality of headend/CMTS 110 operates to amplify and modulate multiple video, audio, and data sources onto a number of 6-MHz-wide RF channels, so that the content of these sources may be received by STBs, such as STB 104. Headend/CMTS 110 may be connected to these video, audio, and data sources via packet-switched network 112, as well as any other networks, satellite connections, private connections, proprietary connections, and any other sources of television and/or data content.

The CMTS (Cable Modem Termination System) functionality of headend/CMTS 110 operates to transmit and receive packet data to and from cable modems via HFC network 108. If STB 104 has an integrated cable modem, headend/CMTS 110 could engage in packet-data communication with STB 104 via HFC network 108. Headend/CMTS 110 thus acts as an interface between RF signals carrying packet data via HFC network 108 and IP signaling via packet-switched network 112. The packet-data signaling between headend/CMTS 110 and cable modems via HFC network 108 may comply with "DOCSIS" (Data Over Cable Service Interface Specification) specifications, available from Cable Television Laboratories, Inc. of Louisville, Colo., which are incorporated herein by reference.

When an STB, such as STB 104, is provisioned for use, such as when a customer signs up for cable-television service, the customer may call the CTSP, during which the CTSP may create an account for the customer, and store all necessary and available account information, such as the customer's name, street address, social security number, and billing information (such as credit card information), etc. Next, the CTSP may send a technician to install STB 104 at the customer's residence. STB 104 will typically have a MAC (Media Access Control) Address, which will typically be assigned to the device by the manufacturer, and will identify STB 104 as a unique physical device. Following installation, the technician may record the MAC address for association with the account. The MAC address may be associated with the customer's account by some manner of data entry, such as by the technician using a device to scan a bar code on STB 104 and transmit the MAC address to some network server.

In operation, each time STB 104 is powered on, it may transmit to a server on the CTSP's network (part of packet-switched network 112), via the out-of-band management channel (or higher-frequency packet-data signaling), a registration-and-authentication message, which may contain the MAC address, as well as any other data uniquely identifying and authenticating STB 104 to the cable provider's network. The majority of cable providers use proprietary methods of registration and authentication specific to their particular headend implementation(s) and STB manufacturer(s); however, some standards are evolving, such as the Open Cable Application Protocol. Once STB 104 has registered and authenticated, the cable provider's network may assign STB 104 a network address to use until the next time STB 104 is powered on. It is to this address that headend/CMTS 110 may transmit data bound for STB 104.

The cable provider's network may then associate STB 104's MAC address with STB 104's assigned network address. Through this association, the customer's account has a unique subscriber-identifier (the MAC address of STB 104) associated with a unique network address (the assigned network address). Typically, this network address will be an IP address, and the cable provider will use IP routing to transmit cable-television content and other data to STB 104. However, proprietary addressing schemes may be used as well, such as a VPN (Virtual Private Network) created between headend/CMTS 110 and STB 104 each time STB 104 is powered on.

Cable-television content may be transmitted to STB 104 on 6-MHz-wide RF channels spanning frequencies greater than 54 MHz. Other communication, such as program guide information, software updates, fault monitoring, configuration, programming, accounting, and performance monitoring, are transmitted on the out-of-band management channel or with higher-frequency packet-data signaling (together, "out-of-band signaling"). Out-of-band signaling is also used by STB 104 to send information to the cable provider's network, such as registration and authentication messages, requests for program guide information, and pay-per-view orders.

If a proprietary routing scheme (rather than IP routing) is used by the cable provider to route data to STBs, STB 104 may use out-of-band signaling to request an IP address and engage in IP communication. Because STB 104 is registered and authenticated by the cable network each time STB 104 is powered on, STB 104 is authenticated on the network for the duration of the time that the power to STB 104 remains on. During this time, therefore, STB 104 may need no further authentication to gain IP connectivity, but may simply need to transmit a request for an IP address to the network. An entity on the network may then assign STB 104 an IP address, which STB 104 may use to engage in IP communication with entities on the cable provider's network, and on packet-switched network 112 generally via a suitable network access server.

Packet-switched network 112 may include one or more wide area networks and/or one or more local area networks, as well as one or more public networks such as the Internet, and/or one or more private networks. Packet-switched network 112 may include one or more networks operated by one or more cable-television service providers (CTSPs), telephone-service providers, and/or cellular-wireless-service-providers. Packets may be routed in and among packet-switched network 112 using the Internet Protocol (IP), and devices in communication with packet-switched network 112, such as headend/CMTS 110, CMS 114, and gateway 116, among many other devices, may be identified by a network address, such as an IP address.

Call Management Server (CMS) 114 may be a network server, arranged to send and receive IP datagrams via packet-switched network 112. CMS 114 may include a network interface such as an Ethernet adapter, a processor, and data storage containing program instructions executable by the processor to carry out the call management functions described herein. For example, CMS 114 may contain instructions to conduct third-party call control (3PCC) functions in accordance with the present invention. CMS 114 may conduct these functions, such as transmitting messages, among circuit-switched telephones, packet-based telephones, cellular wireless telephones, any other types of telephones, or any mixture thereof.

Furthermore, CMS 114 may conduct 3PCC using any number of protocols, including such circuit-switched protocols as ISUP (ISDN User Part) and such packet-based protocols as SIP. In exemplary embodiments, CMS 114 conducts 3PCC in SIP; CMS 114 may thus transmit SIP messages directly to any packet-based telephones, whether wireless or not, perhaps via a suitable proxy or call agent. CMS 114 may conduct 3PCC functions involving circuit-switched telephones via a suitable gateway, perhaps gateway 116. For 3PCC operations involving cellular wireless telephones, CMS 114 may communicate with these telephones via one or more cellular wireless networks, including communication via a wireless air interface.

Gateway 116 provides an interface between packet-switched network 112 and telephone network 118. Depending on the nature of telephone network 118, gateway 116 may take a number of forms. At a minimum, gateway 116 would include a first network interface, adapted for IP communication via packet-switched network 112. Gateway 116 may also include a second network interface, adapted for signaling via telephone network 118. If telephone network 118 were a packet-switched network arranged for VoIP telephony (or perhaps having its own gateways to circuit-switched networks), the second network interface may be similar to the first, or perhaps not be necessary. If, however, telephone network 118 is a circuit-switched or cellular wireless network, the second network interface would be adapted for the necessary signaling. Gateway 116 would also include a processor, as well as data storage containing program instructions executable by the processor to carry out the gateway functionality.

As touched on above, telephone network 118 may take a number of forms. Telephone network 118 may be a packet-switched or circuit-switched network, or perhaps some other type of telephone network now known or later developed. If telephone network 118 is a packet-switched network, telephones in communication with telephone network 118 may communicate with each other using VoIP protocols, and with telephones beyond telephone network 118 via gateway 116. If telephone network 118 is a circuit-switched telephone network, telephones in communication with telephone network 118 may communicate with each other using a suitable circuit-switched telephony protocol such as ISUP, known to those of skill in the art. As an example, telephone network 118 may be the PSTN. Alternatively, telephone network 118 may be a cellular wireless telephone network, communicating with any number of wireless devices, such as cellular wireless telephones, via any number of wireless air interfaces. In general, telephone network 118 represents any combination of one or more telephone networks of the types described, in communication with any number of telephony devices.

Telephone 120 may be any type of telephone in communication with telephone network 118. Telephone 120 may be a circuit-switched telephone communicating via a conventional telephone line, a packet-based telephone communicating via a packet-switched network using VoIP, or perhaps a cellular wireless telephone communicating via a cellular wireless network via a wireless air interface. Telephone 120 may be some other type of telephone as well.

b. Exemplary Cable-Television Host Device

Figure 2:
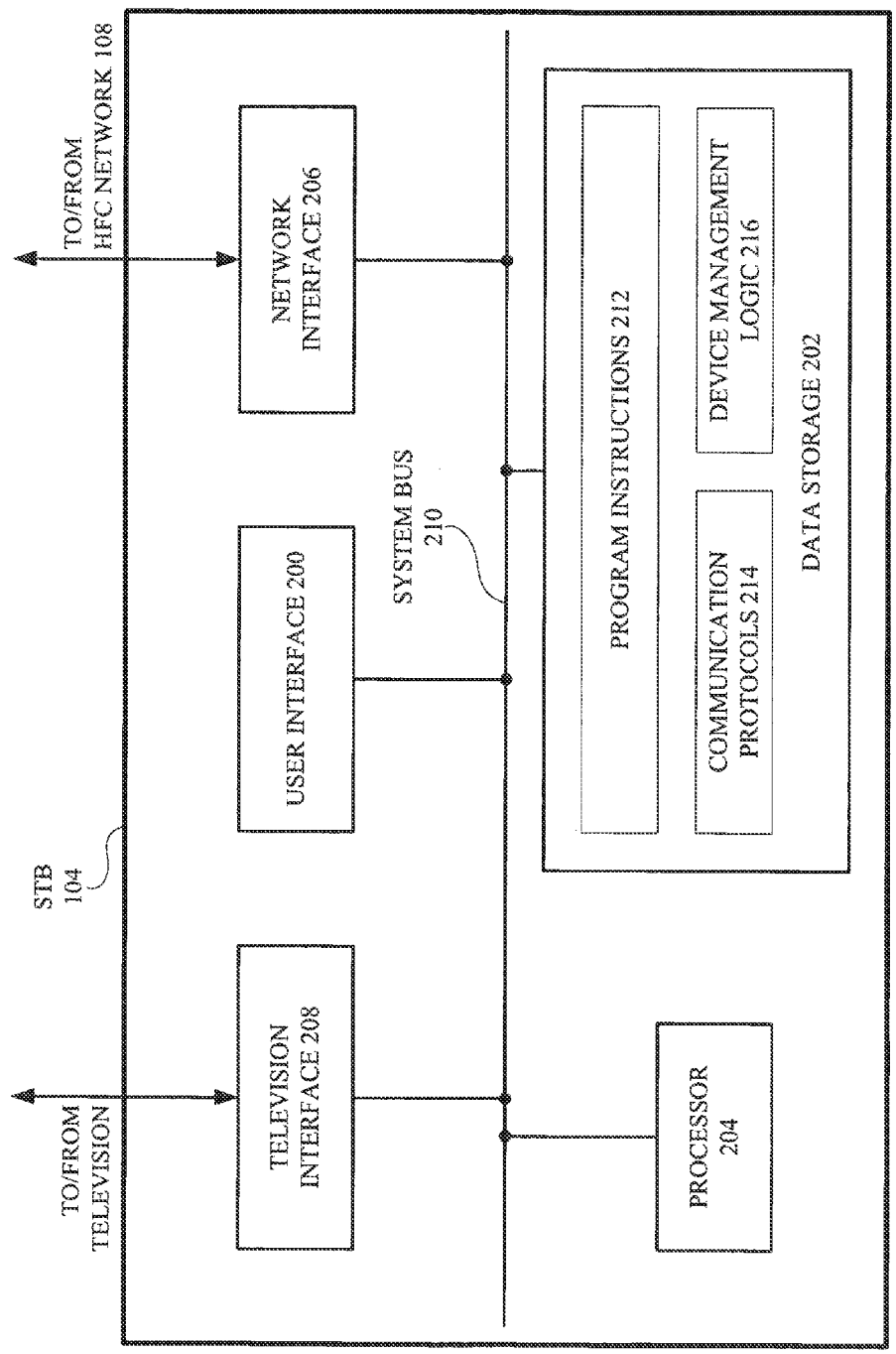
FIG. 2 is a simplified block diagram of a cable-television host device, arranged to carry out exemplary embodiments of the present invention.

FIG. 2 is a simplified block diagram of a cable-television host device, arranged to carry out exemplary embodiments of the present invention. In particular, FIG. 2 is a diagram of STB 104 of FIG. 1. STB 104 includes a user interface 200, a data storage 202, a processor 204, a network interface 206, and a television interface 208, all of which may be communicatively linked by a system bus 210. By way of example, STB 104 may be the Scientific Atlanta Explorer 3250HD, the Scientific Atlanta Explorer 8000HD, or the Motorola DCT5000.

User interface 200 may include mechanisms to provide outputs to and receive inputs from users. For providing outputs, user interface 200 may include a display (e.g., an LCD) for presenting text-based and/or graphics-based messages, menus, prompts, time of day, channel number, etc. User interface 200 may also include a speaker for playing audio recordings and prompts, as well as various LEDs to indicate various states, such as whether STB 104 has received some sort of message from the cable provider. In general, user interface 200 may include any mechanisms now known or later developed for conveying information to users.

For receiving inputs (e.g., commands) from users, user interface 200 may include one or more input mechanisms, such as a remote control communicating with STB 104 via infrared signaling, as well as buttons, a touch-sensitive display, and/or a microphone, etc. Any number of other input mechanisms may also be part of user interface 200. In general, user interface 200 may include any mechanisms now known or later developed for receiving inputs from users.

Data storage 202 may store program instructions 212, communication protocols 214, and device management logic 216. Data storage 202 may take various forms, in one or more parts, such as a non-volatile storage block and/or a removable storage medium. Program instructions 212 may comprise machine language instructions executable by processor 204 to carry out various functions described herein. Communication protocols 214 may be necessary to receive and send data via HFC network 108, packet-switched network 112, and a television. Communication protocols 214 may include SIP, HTTP, DOCSIS, TCP, UDP, IP, SMTP, DHCP, DNS, IMCP, PPP, as well as one or more proprietary protocols, etc. Compatible protocols may be stored in CMS 114, as well as in a network server on the cable provider's network and/or packet-switched network 112. Data storage 202 may also store device management logic 216, which may manage other aspects of STB 104, such as memory and file management.

Processor 204 may control many operations of STB 104 by executing instructions 212, and may comprise multiple (e.g., parallel) processors, such as a general purpose microprocessor and/or a discrete digital signal processor. Processor 204 may periodically update program instructions 212 by downloading updates from the cable network to STB 104 via HFC network 108, using out-of-band signaling. The CTSP may occasionally transmit alerts to STB 104, advising STB 104 that it may obtain an updated application related to, for example, invoking third-party call control. When convenient, STB 104 may download the application from an entity known as a carousel, which may make updated software periodically available.

Network interface 206 provides STB 104 with connectivity to HFC network 108, and may include a network adapter arranged to receive RF signals on the out-of-band management channel and on a plurality of 6 MHz-wide RF television channels, and transmit RF signals via HFC network 108 using the out-of-band management channel. Network interface 206 may also include cable-modem functionality, capable of sending and receiving high-frequency packet-data signals via HFC network 108. If STB 104 is an IP node, network interface 206 may also have Ethernet functionality. Network interface 206 may include ports suitable for transmitting data via coaxial cable, USB or Ethernet cable, or any other physical medium. Additionally, network interface 206 may include wireless-transmission-and-reception capabilities, perhaps a wireless-communication chipset, or other suitable mechanism. Television interface 208 may include a port configured to transmit and receive RF signals to and from a television via coaxial cable.

2. Exemplary Operation a. Exemplary Method

Figure 3:
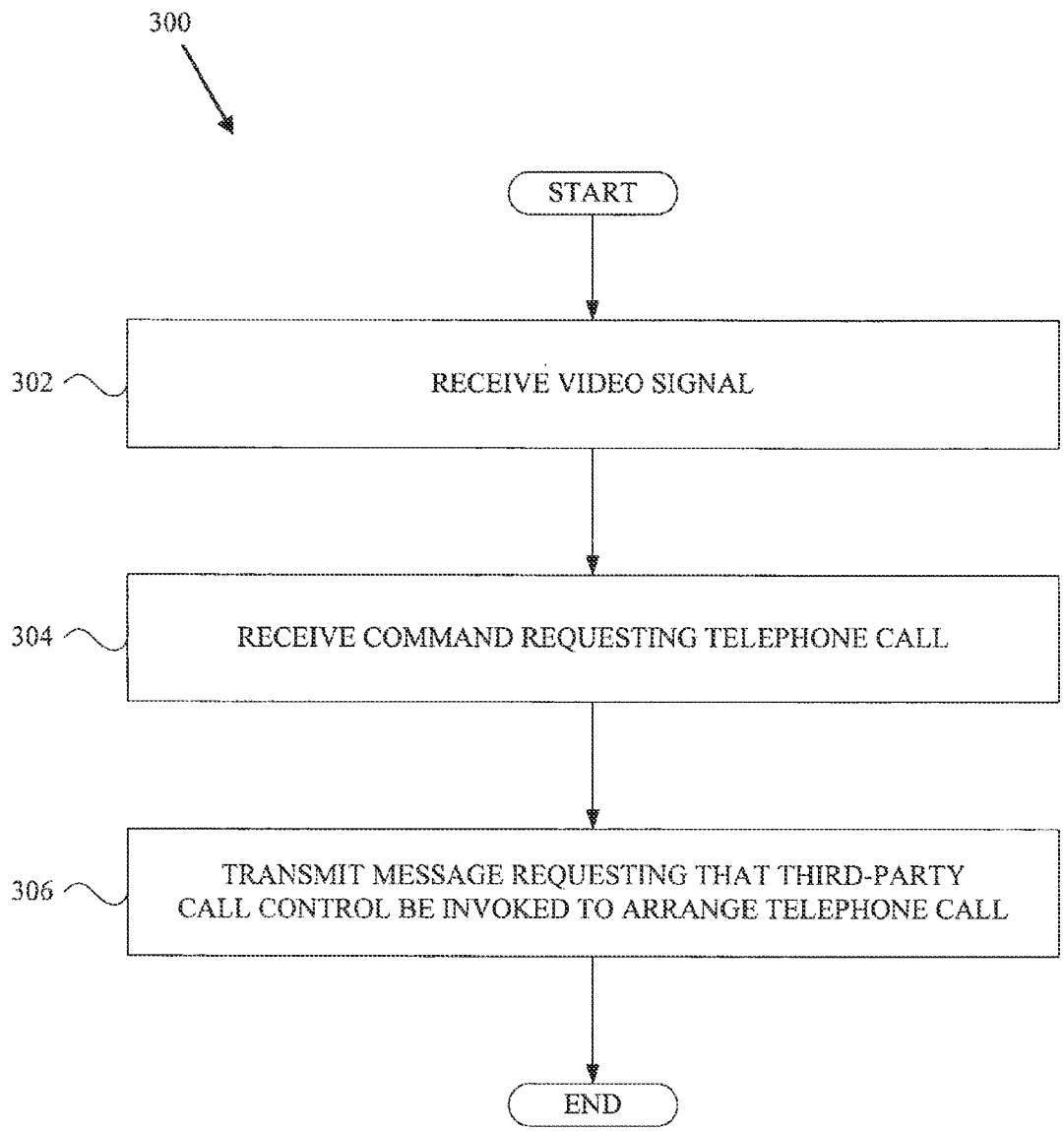
FIG. 3 is a flowchart of an exemplary embodiment of the present invention, carried out along the communications system of FIG. 1.

FIG. 3 is a flowchart of an exemplary embodiment of the present invention, carried out along the communications system of FIG. 1. The method 300 of FIG. 3 begins at step 302, where STB 104 receives a video signal. As explained above, STB 104 may have the capability of receiving only analog television content, in which case STB 104 would send and receive out-of-band messages and data via the out-of-band management channel. STB 104 may, alternatively, also have the capability of receiving digital-cable-television content, in which case STB 104 would still use this channel for out-of-band messaging and data functions. Optionally, STB 104 may have integrated cable-modem functionality, in which case STB 104 could conduct out-of-band messaging and data functions using higher-frequency packet-data communication.

In one embodiment, the video signal transmitted to STB 104 represents a commercial for a pizza-delivery company having many locations, one being geographically closest to STB 104. In general, the signal could be an analog or digital cable-television signal, or perhaps packet-based streaming video, if STB 104 has cable-modem functionality. In any event, the video signal contains an encoded identifier associated with some telephone endpoint, perhaps that of an advertiser. In this example, the identifier is associated with the pizza-delivery company as a whole. The identifier may be encoded in the signal as described above, in the "vertical blanking interval" ("vertical retrace interval") at the end of one or more frames of an RF cable-television signal, or into any convenient portion (e.g., a packet header) of packet-based streaming video.

If the signal is packet-based streaming video, the CMTS functionality of headend/CMTS 110 may receive the packets associated with the video stream from some entity via packet-switched network 112. Headend/CMTS 110 may collect these packets, identify that they are intended for STB 104, and route the packets to STB 104 via HFC network 108. Upon receiving the packets, STB 104 may arrange them in the proper sequence, buffer some amount of video, and display the video on a device such as a television. The video data carried by the packets may conform to a compression protocol such as MPEG, and the packets may be IP packets having associated packet headers. As such, the originating entity of the packets, or headend/CMTS 110, may encode an identifier into one of any number of available packet-header fields. STB 104 may be programmed to recognize the encoded identifier upon receipt of the packets.

As examples, the identifier could be a telephone number, a SIP address, a URL, a URI, an alphanumeric code, or some other identifier associated with a telephony endpoint. In this example, the identifier is a URL associated with a pizza-delivery company as a whole, and the identifier is associated with telephone 120 in that telephone 120 is at the pizza-delivery location geographically closest to STB 104. As explained, telephone 120 could be a circuit-switched, packet-based, cellular wireless, or other type of telephone. In this example, telephone 120 is packet-based, capable of sending and receiving SIP signaling, as well as of conducting VoIP sessions via packet-switched network 112, and via telephone network 118 via gateway 116. STB 104, recognizing that the video signal contains the encoded identifier, prompts the user by, e.g., displaying an icon on the television, inviting the user to initiate a call with the advertiser.

At step 304, STB 104 receives a command from the user, requesting that a telephone call be established between the advertiser's telephone (telephone 120) and the user's telephone (telephone 106). Telephone 106 could be a circuit-switched, packet-based, cellular wireless, or other type of telephone. In this example, telephone 106 is the user's cellular wireless telephone, arranged to communicate with telephone network 118 via an air interface. By implication, in this example, telephone network 118 includes a cellular wireless network. Thus, in this example, telephone 106 is associated with the user of STB 104, though this is not necessary.

At step 306, STB 104 transmits a message via HFC network 108, headend/CMTS 110, and packet-switched network 112 to CMS 114. CMS 114 may be located on the cable provider's network or some other network. In this example, CMS 114 is located on the network operated by or on behalf of the pizza company. The message may be an HTTP or SIP request, or conform to some other protocol. In this example, the message is an HTTP GET request using the URL found in the encoded identifier as the destination URL. The GET request contains a message body conveying a request that CMS 114 invoke third-party call control between telephone 106 and a pizza-delivery restaurant close to STB 104, as well as the telephone number associated with telephone 106, and information conveying the location of STB 104.

The data related to the telephone number of telephone 106 and the location of STB 104 may have been stored in STB 104 as part of an initial setup process of STB 104, or as part of a setup process of the application related to requesting third-party call control, or at some other time. In any event, processor 204 may execute code to retrieve that information and include it in the message before transmitting the message to CMS 114. Other alternatives exist as well, however, for conveying telephone 106's telephone number and location data related to STB 104 to CMS 114. STB 104 may include a unique identifier, such as the MAC address of STB 104, in the message, which a network entity may map to the desired information. Alternatively, an entity on the cable provider's network may be able to identify the IP address from which the message was sent, and map that address to the STB to which it is currently assigned, thereby identifying the proper user's account, within which may be stored the desired data.

STB 104 may not always transmit the message directly to a CMS or 3PCC controller; rather, STB 104 may transmit the message to a server associated with an advertiser, which may then enlist a CMS or 3PCC controller. Or, STB 104 may be programmed to send every call-request message to the same network server, perhaps corresponding to situations in which the identifier is a phone number or a SIP address of a telephony endpoint such as telephone 120.

Alternatively, the network server to which STB 104 transmits the message may depend on the identifier itself. For example, the identifier may include information about where to send the message, such as a URL or URI. Or, STB 104 may be programmed to map certain identifiers (telephone numbers, alphanumeric codes) to particular Internet addresses or phone numbers.

And instead of including a telephone number for telephone 106, STB 104 may send a message that causes a SIP address or some other contact information to be conveyed to CMS 114.

Upon receiving the data related to the location of STB 104, CMS 114 or another network entity may use the data to select the pizza-delivery location geographically closest to STB 104 to be one of the two endpoints of the arranged call. Identifying company locations close to a street address, intersection, zip code, or other indication of location is known to those of skill in the art. For example, numerous websites include a "Store Locator" or similarly-named feature, where consumers may enter location information into an HTML form, send the form to a server, and receive in response a web page listing the company's locations, sorted in order of proximity to a particular location. The present invention may use similar programming logic with respect to the location of STB 104 to select one of the two endpoints to the arranged call.

And rather than the network entity using the location of STB 104 as a basis for selecting one of the two telephony endpoints to include in the call-setup sequence, the network entity may instead use the location of telephone 106, or any other location. In some embodiments, GPS (Global Positioning System) technology could be used to identify the location of telephone 106, if telephone 106 were a GPS-enabled device, as cellular wireless telephones increasingly are.

Other possibilities exist, such as STB 104 prompting the user to input location data such as GPS coordinates, street address, intersection, zip code, or other data. Optionally, telephone 106 may be able to transmit its location to STB 104, which would incorporate that information in the message. In another embodiment, CMS 114, STB 104, or some other entity may be able to query a location server associated with the telephone network providing service to telephone 106, to thereby acquire telephone 106's location. The telephone number associated with telephone 106 or the home telephone number associated with STB 104's account information stored by the CTSP could be used as well. In general, CMS 114 or some other network entity could then use this location information to select a telephone for one end of the arranged call.

b. Exemplary Call Flow

Figure 4:
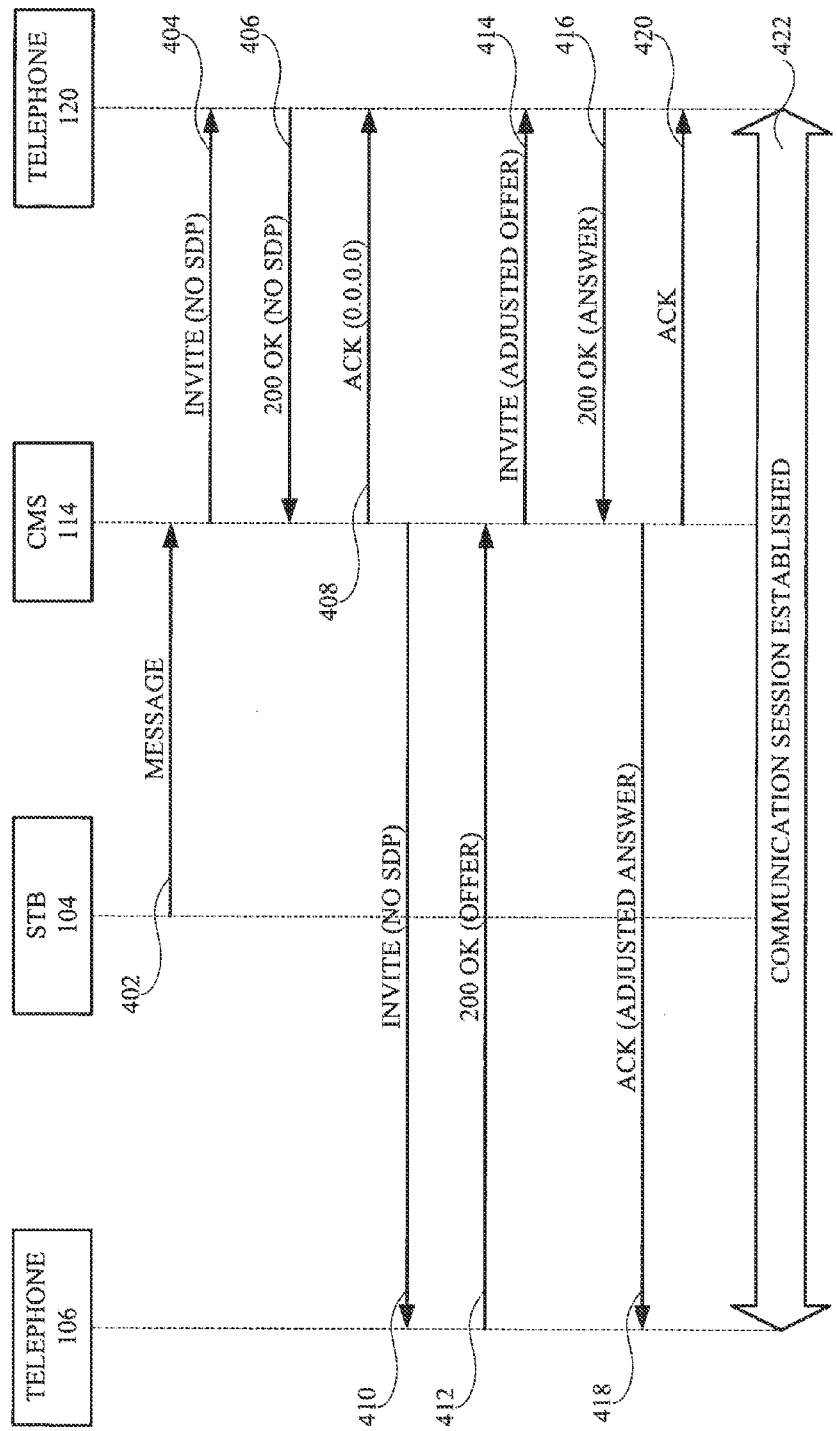
FIG. 4 is a call flow diagram in accordance with exemplary embodiments of the present invention.

FIG. 4 is a call flow diagram in accordance with exemplary embodiments of the present invention. Call flow 400 begins at step 402, when STB 104 transmits the above-described message to CMS 114. Although step 402 depicts the message being transmitted from STB 104 to CMS 114 directly, there could be one or more intermediate entities involved. That is, STB 104 may transmit the message to some intermediate server, such as an application server programmed to conduct telephony operations in accordance with the present invention. That intermediate server may then enlist a call management server such as CMS 114 to conduct 3PCC functions. In general, any number of intermediate network entities (such as network servers, gateways, network access servers, proxies, call agents, etc.) may be involved in any of the steps of call flow 400, without departing from the spirit and scope of the present invention.

At step 404, CMS 114 transmits a SIP INVITE message to telephone 120, which, in this example, is a SIP-enabled, packet-based telephone. The INVITE of step 404 contains no session description information. At step 406, telephone 120 transmits a 200 OK response to CMS 114, also without session description information. Note that, in call flow 400 of FIG. 4, any necessary SIP proxies or call agents are omitted for clarity. At step 408, CMS 114 transmits an ACK to telephone 120, which puts telephone 120 "on hold" due the inclusion of the "0.0.0.0" IP address as the IP address that telephone 120 "should" contact.

At step 410, CMS 114 transmits an INVITE to telephone 106, which, in this example, is a SIP-enabled cellular wireless telephone. The INVITE of step 410 also contains no session description information. At step 412, telephone 106 responds to CMS 114 with a 200 OK, including the first instance of session description information in call flow 400. The session description information included in the 200 OK of step 412 is known as telephone 106's "offer," and represents media parameters acceptable or preferable to telephone 106 (protocols, encoding, etc.). At step 414, CMS 114 transmits an INVITE to telephone 120, including the offer from step 412, which CMS 114 may first have adjusted for compatibility with telephone 120.

At step 416, telephone 120 transmits a 200 OK to CMS 114, including its acceptance or rejection of the parameters included in the adjusted offer of step 414. At step 418, CMS 114 transmits an ACK to telephone 106, including telephone 120's "answer" from step 416, which CMS 114 may first adjust if necessary. At step 420, CMS 114 transmits an ACK to telephone 120. At this point, at step 422, a compatible set of media parameters has been identified and conveyed to both telephones 106 and 120, which may then engage in the communication session.

The call flow of FIG. 4 is one of many possibilities. For example, the third-party call control may be conducted such that either party (e.g., advertiser or user) is contacted first, and then waits for the other party. Regardless of the chosen call flow, the call is initiated by STB 104, which has no direct connection, such as a phone line, to a telephone network.

3. Conclusion

Various exemplary embodiments of the present invention have been described above. Those skilled in the art will understand, however, that changes and modifications may be made without departing from the scope of the present invention, which is defined by the claims.

What is claimed is:

1. A method comprising:
    transmitting to a cable-television host device a video signal and an encoded first identifier associated with a first telephony endpoint for display by the cable-television host device of both the video signal and a prompt associated with the first identifier;
    receiving from the cable-television host device a request to establish a telephone call, wherein the request is associated with the displayed prompt, wherein the request comprises content associated with the first identifier, and wherein the request further comprises at least one identifier of the cable-television host device;
    using the at least one identifier of the cable-television host device to identify a second telephony endpoint, wherein the second telephony endpoint is associated with a user of the cable-television host device; and
    invoking third-party call control to attempt to establish a telephone call between the first telephony endpoint and the identified second telephony endpoint.

2. The method of claim 1, wherein the video signal is selected from the group consisting of a cable-television signal and packet-based streaming video.

3. The method of claim 1, wherein the first identifier is selected from the group consisting of a telephone number, a SIP (Session Initiation Protocol) address, a URL (Uniform Resource Locator), a URI (Uniform Resource Identifier), and an alphanumeric code.

4. The method of claim 1, wherein at least one of the first telephony endpoint and the second telephony endpoint is selected from the group consisting of a circuit-switched telephone, a packet-based telephone, and a cellular wireless telephone.

5. The method of claim 1, wherein the first telephony endpoint is associated with an advertiser, and wherein a content of the video signal is also associated with the advertiser.

6. The method of claim 1, wherein the request conforms to a protocol selected from the group consisting of HTTP (HyperText Transfer Protocol) and SIP (Session Initiation Protocol).

7. The method of claim 1, wherein the request further comprises an indication of a location of at least one of the second telephony endpoint and the cable-television host device.

8. The method of claim 1, wherein transmitting the first identifier comprises transmitting an identifier based at least in part on a location of at least one of the second telephony endpoint and the cable-television host device.

9. The method of claim 1, wherein the cable-television host device is selected from the group consisting of a set top box, a digital set top box, and an integrated terminal device.

10. The method of claim 1, wherein the cable-television host device comprises a cable modem.

11. A system comprising:
    at least one network interface;
    at least one processor; and at least one computer-readable storage medium comprising instructions that are executable by the at least one processor to:
  transmit to a cable-television host device a video signal and an encoded first identifier associated with a first telephony endpoint for display by the cable-television host device of both the video signal and a prompt associated with the first identifier;
  receive from the cable-television host device a request to establish a telephone call, wherein the request is associated with the displayed prompt, wherein the request comprises content associated with the first identifier, and wherein the request further comprises at least one identifier of the cable-television host device;
  use the at least one identifier of the cable-television host device to identify a second telephony endpoint, wherein the second telephony endpoint is associated with a user of the cable-television host device; and
  invoke third-party call control to attempt to establish a telephone call between the first telephony endpoint and the identified second telephony endpoint.

12. The system of claim 11, wherein the video signal is selected from the group consisting of a cable-television signal and packet-based streaming video.

13. The system of claim 11, wherein the first identifier is selected from the group consisting of a telephone number, a SIP (Session Initiation Protocol) address, a URL (Uniform Resource Locator), a URI (Uniform Resource Identifier), and an alphanumeric code.

14. The system of claim 11, wherein at least one of the first telephony endpoint and the second telephony endpoint is selected from the group consisting of a circuit-switched telephone, a packet-based telephone, and a cellular wireless telephone.

15. The system of claim 11, wherein the first telephony endpoint is associated with an advertiser, and wherein a content of the video signal is also associated with the advertiser.

16. The system of claim 11, wherein the request conforms to a protocol selected from the group consisting of HTTP (HyperText Transfer Protocol) and SIP (Session Initiation Protocol).

17. The system of claim 11, wherein the request further comprises an indication of a location of at least one of the second telephony endpoint and the cable-television host device.

18. The system of claim 11, wherein the instructions to transmit the first identifier comprise instructions to transmit an identifier based at least in part on a location of at least one of the second telephony endpoint and the cable-television host device.

19. The system of claim 11, wherein the cable-television host device is selected from the group consisting of a set top box, a digital set top box, and an integrated terminal device.

20. The system of claim 11, wherein the cable-television host device comprises a cable modem.

* * * * *